United States Patent
Tada et al.

(10) Patent No.: US 8,239,722 B2
(45) Date of Patent: Aug. 7, 2012

(54) PACKET RETRANSMISSION CONTROL METHOD AND APPARATUS IN MULTICAST COMMUNICATION

(75) Inventors: Atsuko Tada, Kawasaki (JP); Ryuta Tanaka, Kawasaki (JP); Takashi Hamano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 581 days.

(21) Appl. No.: 12/501,842

(22) Filed: Jul. 13, 2009

(65) Prior Publication Data

US 2010/0077273 A1    Mar. 25, 2010

(30) Foreign Application Priority Data

Sep. 19, 2008   (JP) ................. 2008-240564

(51) Int. Cl.
*H04L 1/18*    (2006.01)
(52) U.S. Cl. .................... 714/749; 455/518
(58) Field of Classification Search .......... 714/749; 455/518

See application file for complete search history.

(56) References Cited

U.S. PATENT DOCUMENTS

| | | | |
|---|---|---|---|
| 2005/0076127 A1* | 4/2005 | Wilson et al. ............. | 709/227 |
| 2008/0057992 A1* | 3/2008 | Griffin ................... | 455/518 |
| 2009/0103500 A1* | 4/2009 | Malkamaki et al. ........ | 370/336 |

FOREIGN PATENT DOCUMENTS

| | | |
|---|---|---|
| JP | 2002-344477 | 11/2002 |
| JP | 2004-199578 | 7/2004 |
| JP | 2004-318274 | 11/2004 |
| JP | 2007-228064 | 9/2007 |

\* cited by examiner

*Primary Examiner* — M. Mujtaba K Chaudry
(74) *Attorney, Agent, or Firm* — Staas & Halsey LLP

(57) ABSTRACT

In a multicast distribution system in which terminal devices on a distribution path are hierarchically grouped, a first terminal device which has detected a loss of a receiving packet transmits to a second terminal device located upstream of the first terminal device a retransmission request for a packet retransmission to the first terminal device and a third terminal device which receives a packet first in a group located downstream of a group to which the first terminal device belongs. The second terminal device which has received the retransmission request transmits a retransmission packet to both the first and third terminal devices.

6 Claims, 19 Drawing Sheets

TABLE 1 CONNECTION INFORMATION

| TERMINAL | IP ADDRESS |
|---|---|
| PARENT TERMINAL | 123.456.0.1 |
| CHILD TERMINAL | 123.456.1.11 |
| ⋮ | ⋮ |
| CHILD TERMINAL | 123.456.1.19 |

F I G. 3

TABLE 2 GROUP INFORMATION

|  | GROUP NUMBER | SUB-ROOT TERMINAL |
|---|---|---|
| LOCAL GROUP | 1 | 123.456.0.1 |
| CHILD GROUP | 3 | 123.456.2.11 |
| CHILD GROUP | 4 | 123.456.4.11 |
| : | : |  |
| CHILD GROUP | 8 | 123.456.8.11 |

F I G. 4

TABLE 3    TRANSFER DATA HEADER INFORMATION

|   | HEADER INFORMATION |
|---|---|
| 1 | DATA TYPE |
| 2 | SEQUENCE NUMBER |
| 3 | SOURCE ADDRESS |
| ⋮ | ⋮ |

F I G. 6

TABLE 4  DATA TYPE

| DATA TYPE | OUTLINE |
|---|---|
| NORMAL DATA | DATA TO BE TRANSMITTED |
| RETRANSMISSION DATA | RETRANSMISSION DATA WHEN LOSS IS DETECTED |
| LOSS INFORMATION | INFORMATION WHEN LOSS IS DETECTED |
| ⋮ | ⋮ |

FIG. 7

TABLE 5  LOSS INFORMATION LIST

|  | LOSS INFORMATION SEQUENCE NUMBER |
|---|---|
| 1 | 234 |
| ⋮ | ⋮ |
| 10 | 1022 |

FIG. 8

TABLE 6  ADVANCE RETRANSMISSION DATA LIST

| | RETRANSMISSION DATA SEQUENCE NUMBER | RETRANSMISSION DATA | SUPPLEMENT |
|---|---|---|---|
| 1 | 56 | RETRANSMISSION DATA 56 | PERFORMED |
| ⋮ | ⋮ | ⋮ | NOT PERFORMED |
| 4 | 209 | RETRANSMISSION DATA 206 | NOT PERFORMED |

FIG. 9

TABLE 7 MESSAGE INFORMATION

|   | MESSAGE INFORMATION |
|---|---------------------|
| 1 | MESSAGE TYPE |
| 2 | DATA SOURCE ADDRESS |
| 3 | OPTIONAL DATA TYPE |
| 4 | OPTIONAL DATA LENGTH |
| 5 | OPTIONAL DATA |

FIG. 12

TABLE 8   MESSAGE TYPE

| MESSAGE TYPE | OUTLINE |
|---|---|
| CONNECTION REQUEST | CONNECTION REQUEST MESSAGE FOR CONNECTION OF LOCAL TERMINAL TO DISTRIBUTION TREE (TRANSMITTING TO TERMINAL TO WHICH CONNECTION IS MADE) |
| DISCONNECTION REQUEST | DISCONNECTION REQUEST MESSAGE FOR DISCONNECTION OF LOCAL TERMINAL FROM DISTRIBUTION TREE (TRANSMITTING TO CHILD TERMINAL AND PARENT TERMINAL OF LOCAL TERMINAL) |
| RETRANSMISSION REQUEST | REQUEST MESSAGE FOR RETRANSMISSION OF DATA TO SOURCE TERMINAL WHEN LOST DATA IS DETECTED IN RECEIVED DATA |
| ... | ... |
| ... | ... |

FIG. 13

PACKET RETRANSMISSION CONTROL METHOD AND APPARATUS IN MULTICAST COMMUNICATION

CROSS-REFERENCE TO RELATED APPLICATIONS

This application is based upon and claims the benefit of priority of the prior Japanese Patent Application No. 2008-240564, filed on Sep. 19, 2008, the entire contents of which are incorporated herein by reference.

FIELD

The embodiments discussed herein relate to the technology for controlling a packet retransmission when a packet is lost in a multicast communication.

BACKGROUND

A retransmitting process (ARQ (automatic repeat request)) for a loss of a packet in an IP (Internet protocol) network is to determine a loss of a packet depending on a reply of an ACK (normal reply) or a NACK (abnormal reply), and retransmit a lost packet.

When the ARQ is applied to a multicast communication or an ALM (application layer multicast), the following problem occurs.

That is, after a lost packet is corrected and prepared data is transferred to a downstream terminal, there occurs a correction delay. As illustrated in FIG. 18, an upstream correction delay propagates to downstream, a delay is added each time a loss occurs, and a buffer overflows in a downstream terminal.

Related Art 1: To suppress the above-mentioned correction delay, a packet is transferred even in a correcting (retransmitting) process in the related art. FIG. 19 is the outline of the retransmitting process according to the related art. In this method, since loss information about a packet is propagated to a downstream terminal, a retransmission request from each terminal to which the information is propagated is suppressed. Furthermore, a correction is made in a downstream terminal by multicasting a retransmission packet.

Related Art 2: Networks and communication devices have a parent-child relation and a brother-relation in an ALM, and an ACK or a NACK is transmitted to an elder brother (parent if there is no elder brother). Thus, there occurs no congestion of replies of ACKs or NACKs, or retransmissions of packets, and the increase of traffic is distributed, thereby suppressing the overflow of a buffer in a terminal functioning as a leaf.

Patent Document 1: Japanese Laid-open Patent Publication No. 2007-228064
Patent Document 2: Japanese Laid-open Patent Publication No. 2004-318274
Patent Document 3: Japanese Laid-open Patent Publication No. 2004-199578

SUMMARY

According to an aspect of an embodiment of the present invention, a method for performing retransmission control when a packet is lost in a multicast distribution system in which terminal devices on a distribution path are hierarchically grouped includes: transmitting from a first terminal device which has detected a loss of a receiving packet to a second terminal device located upstream of the first terminal device a retransmission request for a packet retransmission to the first terminal device and a third terminal device which receives a packet first in a group located downstream of a group to which the first terminal device belongs; and transmitting a retransmission packet from the second terminal device which has received the retransmission request to both the first and third terminal devices.

According to another aspect of an embodiment of the present invention, an apparatus for performing retransmission control when a packet is lost in a multicast distribution system in which terminal devices on a distribution path are hierarchically grouped includes a retransmission request transmission unit and a retransmission packet transmission unit. The retransmission request transmission unit transmits a retransmission request for a packet retransmission to the apparatus and a terminal device that first receives a packet in a group located downstream of a group to which the apparatus belongs, to a terminal device located upstream of the apparatus when a loss of a receiving packet is detected. The retransmission packet transmission unit transmits a retransmission packet to each terminal device specified as a retransmission destination by the retransmission request when the retransmission request is received.

The object and advantages of the present invention will be realized and attained by means of the elements and combinations particularly pointed out in the claims.

It is to be understood that the foregoing general description and the following detailed description are exemplary and explanatory and are not restrictive of the invention, as claimed.

BRIEF DESCRIPTION OF DRAWINGS

FIG. 3 illustrates table 1 of connection information;

FIG. 4 illustrates table 2 of group information;

FIG. 6 illustrates table 3 of header information of transfer data;

FIG. 7 illustrates table 4 of data types described as header information;

FIG. 8 illustrates table 5 of a loss information list;

FIG. 9 illustrates table 6 of an advance retransmission data list;

FIG. 12 illustrates the data structure of a message communicated between the terminals in a distribution path;

FIG. 13 illustrates the data of a message type;

DESCRIPTION OF EMBODIMENTS

Figure 1:
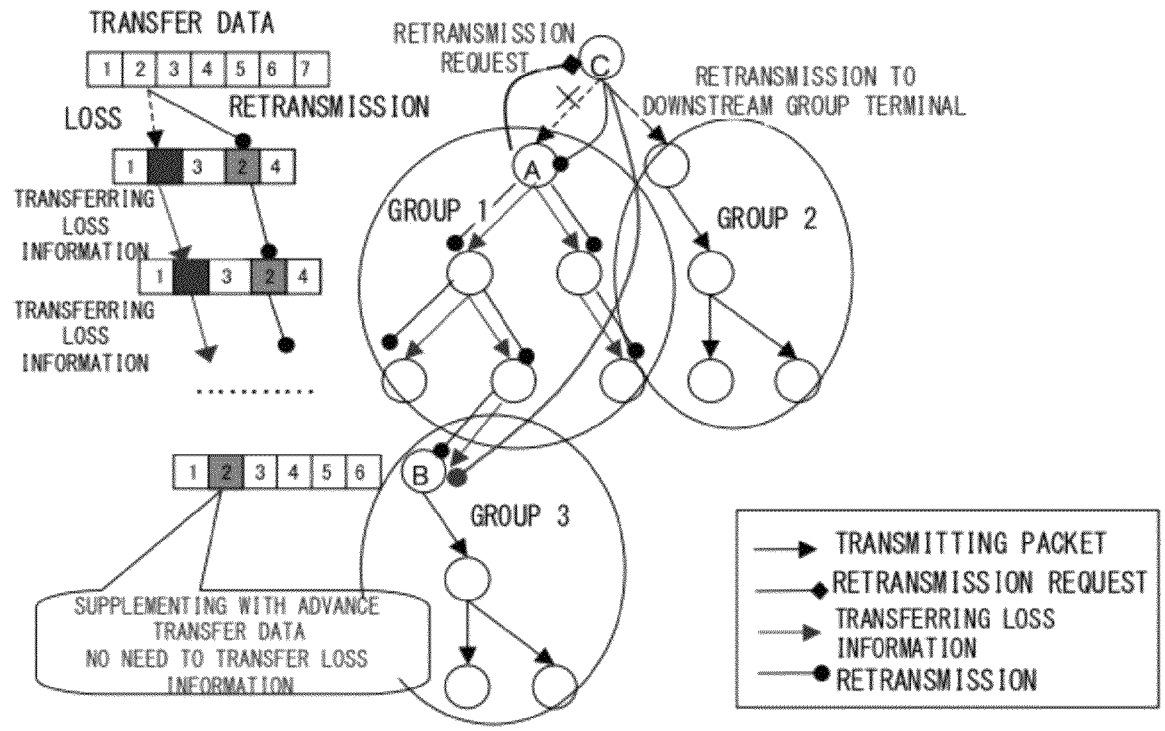
FIG. 1 is an explanatory view of an operation in the retransmitting process according to an embodiment of the present invention.

The above-mentioned related art 1 has the problem that the traffic increases by a transfer of loss information.

The above-mentioned related art 2 has the problem that the correction delay for a lost packet increases because a retransmission is not performed directly from a parent to a child (retransmission is made from a parent to a local device through a brother). Therefore, a loss of a packet is propagated, thereby further expanding a correction delay.

As described above, in the retransmitting process in a multicast communication, there is the problem of increasing traffic and correction delays, but there is no related art that has successfully solved or reduced both problems. Especially, in streaming distribution, there arises the problem that moving pictures are destroyed by increasing correction delays.

Preferred embodiments of the present invention will be explained with reference to accompanying drawings.

The present embodiment is based on the method or the apparatus for performing retransmission control when a packet is lost in a multicast distribution system in which terminal devices on a distribution path are hierarchically grouped.

In a retransmission request transmission step (FIG. 11), a first terminal device that has detected a loss of a receiving packet transmits to a second terminal device located upstream of the first terminal device a retransmission request for a packet retransmission to the first terminal device and a third terminal device that receives a packet first in a group located downstream of a group to which the first terminal device belongs.

In a retransmission packet transmission step (FIG. 15), the second terminal device that has received the retransmission request transmits the retransmission packet to both the first and third terminal devices.

In the configuration of the above-mentioned embodiment, the following loss information transfer step and retransmission packet transfer step may be included.

That is, in the loss information transfer step (FIG. 14), the first terminal device sequentially transfers packet loss information to each terminal device located downstream of the first terminal device.

Then, in the retransmission packet transfer step (FIG. 16), the first terminal device sequentially transfers the retransmission packet received from the second terminal device to each terminal device located downstream of the first terminal device.

The configuration according to the above-mentioned embodiment may also include the following discard step.

That is, in the discard step (FIGS. 14 and 16), the third terminal device discards the packet loss information transferred from a group located upstream of the group to which the third terminal device belongs and the retransmission packet transferred corresponding to the packet loss information.

Alternatively, in another discard step, the packet loss information and retransmission packet to be transferred to a downstream terminal are discarded at the last terminal in the group to which the first terminal device belongs.

In the configuration according to the above-mentioned embodiments, the third terminal device may further include a supplementing step for supplementing a first normal packet received from a group located upstream of the group to which the third terminal device belongs with a retransmission packet received from the second terminal device as a second normal packet, and transmitting the first normal packet and the second normal packet to a terminal device located downstream of the third terminal device.

When group management is performed and a packet is lost, a retransmission request for a packet retransmission to the local terminal and a retransmission request for a packet retransmission to a downstream-group terminal are simultaneously transmitted to an upstream terminal.

Upon receipt of the retransmission request, the upstream terminal transmits a retransmission packet to both the local terminal and the downstream-group terminal specified as a retransmission destination by the retransmission request.

The terminal that has received the retransmission packet from an upstream group supplements the normal packet with the retransmission packet, thereby suppressing the transfer of the packet loss information and the retransmission packet, and performing a transfer of a normal packet to a downstream terminal.

According to the above-mentioned embodiment, the propagation of a loss of a packet can be suppressed, and the increasing traffic and correction delays in the related art can be held in a group, thereby preventing traffic from increasing and suppressing the correction delays in terminals located downstream of that group.

In the embodiment described below, in the multicast distribution system in which terminals (nodes) in a distribution path are hierarchically grouped, the propagation of a loss of a packet can be suppressed by controlling a retransmission process in case of packet loss so that a retransmission packet can be transmitted (transferred in advance) directly from a retransmission source to any terminal in a downstream terminal group for which the propagation of packet loss information is predicted.

The operations of the retransmitting process according to the present embodiment is described below with reference to the explanatory view in FIG. 1.

Described below is the retransmitting process performed when a packet is lost.

Step 1: A loss of a packet occurs in transferring the packet from terminal C to terminal A.

Step 2: A retransmission request is transmitted from terminal A to terminal C. In the retransmission request, the address of terminal B is transmitted as a concurrent transmission address list.

Step 3: Packet loss information is transferred to downstream terminals in the group from terminal A.

Step 4: The packet is retransmitted from terminal C to terminal A. Terminal A multicasts the received retransmission packet.

Step 5: The packet is retransmitted from terminal C to terminal B.

Step 6: Terminal B multicasts the packet after supplementing a loss position with the received retransmission packet as a normal transfer packet.

After the above-mentioned operations, it is not necessary to transfer the loss information for the transfer data "2" in the group 3, thereby solving the problem of increasing traffic and correction delays.

Figure 2:
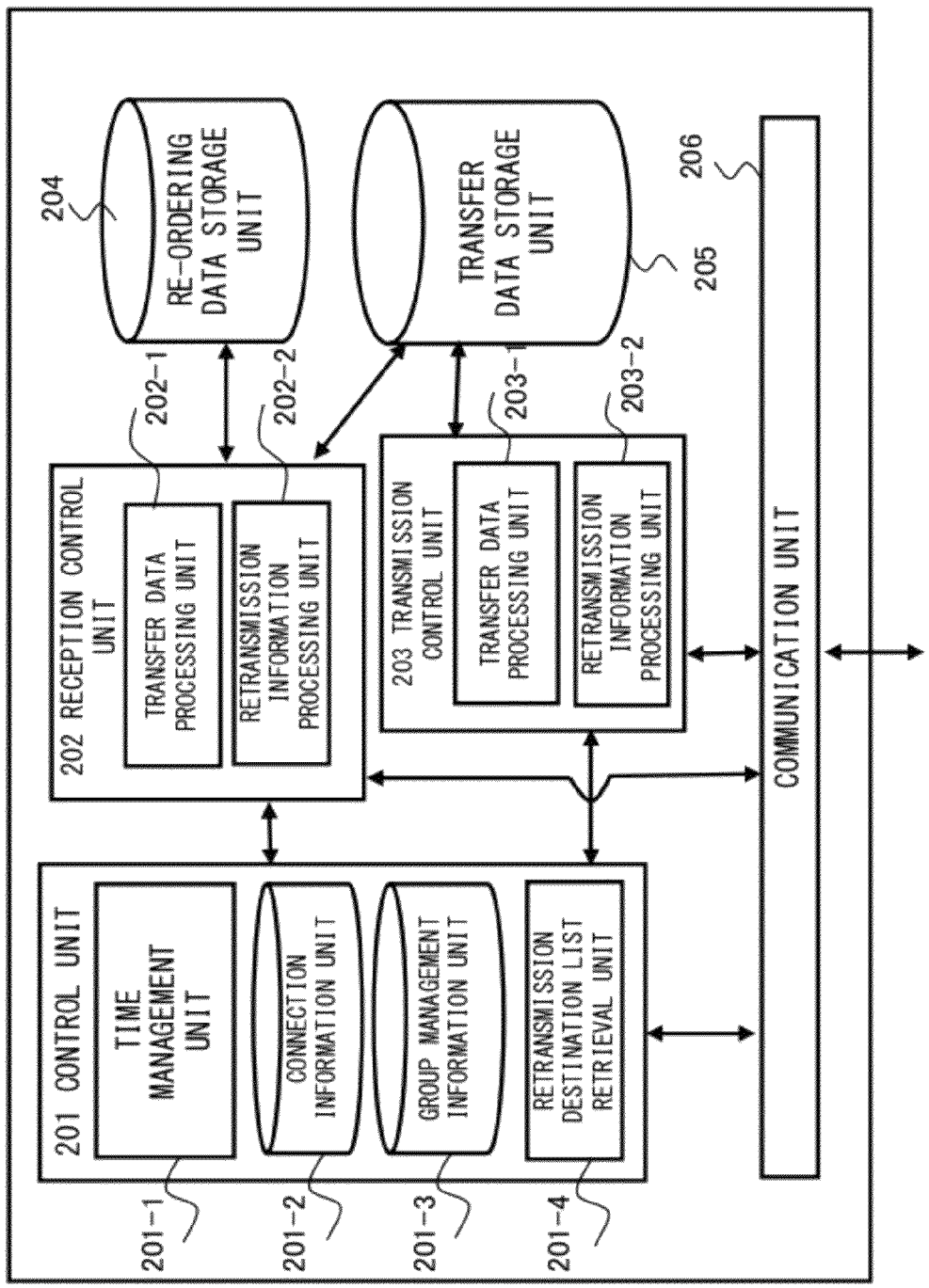
FIG. 2 is a view of the basic configuration of an embodiment of the present invention.

FIG. 2 illustrates the basic configuration of an embodiment of the present invention.

A control unit 201 includes a time management unit 201-1, a connection information unit 201-2, a group management information unit 201-3, and a retransmission destination list retrieval unit 201-4.

The control unit 201 activates a reception control unit 202 and a transmission control unit 203, and controls operation timing and a retransmission request.

When a retransmission request for a lost packet is made (when a retransmission request is received from the reception control unit 202), the control unit 201 transmits the retransmission request to a source (parent) terminal held in the connection information unit 201-2 (requests the transmission control unit 203 to transmit the request).

When the retransmission request is transmitted by the control unit 201, the group management information unit 201-3 retrieves a terminal to which the packet is simultaneously transferred in advance using the retransmission determination list retrieval unit 201-4, and adds the terminal address to the retransmission request.

The reception control unit 202 includes a transfer data processing unit 202-1 and a retransmission information processing unit 202-2.

In the reception control unit 202, the transfer data processing unit 202-1 writes the data received (read) from a communication unit 206 to a transfer data storage unit 205, and simultaneously writes the data to a re-ordering data storage unit 204. When the transfer data processing unit 202-1 writes data to the re-ordering data storage unit 204, it rearranges the transfer data in the order of sequence numbers.

The retransmission information processing unit 202-2 retrieves (the sequence number of) a packet that may have been lost during the transfer from the sequence of data stored in the re-ordering data storage unit 204, and transmits a retransmission request for a lost packet to the control unit 201.

In addition, the retransmission information processing unit 202-2 also performs the process when retransmission data transferred in advance is received. That is, the retransmission information processing unit 202-2 changes the retransmission data transferred in advance into normal transfer data, determines the transfer order from the sequence number etc., and writes the transfer data to the transfer data storage unit 205 and the re-ordering data storage unit 204.

The transmission control unit 203 includes the transfer data processing unit 203-1 and the retransmission information processing unit 203-2.

The transfer data processing unit 203-1 reads the data stored in the transfer data storage unit 205, and transmits a transmission request for the data to the communication unit 206.

The retransmission information processing unit 203-2 transmits the retransmission request received from the control unit 201 to the communication unit 206.

The re-ordering data storage unit 204 stores the received data in the order of sequence numbers etc.

The transfer data storage unit 205 writes and reads data in the order in which the data is transferred.

With the above-mentioned configuration, the control is performed so that a retransmission packet can be transmitted (transferred in advance) directly from a retransmitting device to a terminal in a downstream terminal group to which the propagation of a loss of a packet is expected in the retransmitting process, thereby suppressing the propagation of packet loss information.

Described concretely below are the operations according to the present embodiment with the above-mentioned configuration.

The present embodiment relates to the retransmitting process performed when a packet is lost in a distribution path in which terminals are hierarchically grouped in an ALM (application layer multicast). All internal configurations of each terminal arranged in the distribution path may have the same configurations as illustrated in FIG. 2.

In the control unit 201 in FIG. 2, the connection information unit 201-2 stores the connection information of the local terminal, and the group management information unit 201-3 stores group information. The connection information and the group information are listed in table 1 in FIG. 3 and table 2 in FIG. 4.

The connection information listed in table 1 in FIG. 3 includes the IP (Internet protocol) address of a parent terminal for transmitting data to the local terminal and the IP address of a child terminal to which data is transmitted from the local terminal.

In addition, the group information listed in table 2 in FIG. 4 includes the information of the local group (the group number and the IP address of the terminal as a sub-root for first receiving data in the local group) and the information of a child group (the group number and the IP address of the terminal as a sub-root for first receiving data in the child group).

Figure 5:
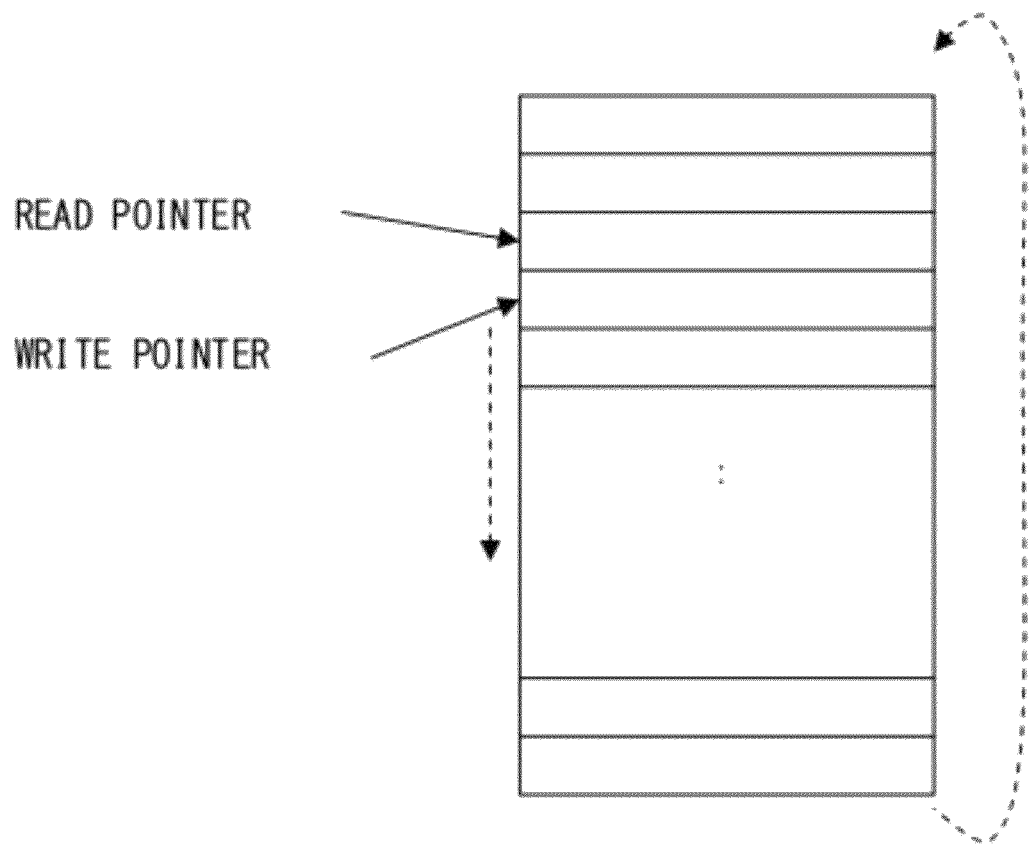
FIG. 5 illustrates the configuration of a transfer buffer.

Each terminal also has a transfer buffer for transfer of data and a re-ordering buffer for storing received data after rearranged in the order of sequence numbers. The loss of a packet is determined by checking data in the re-ordering buffer. The re-ordering data storage unit 204 illustrated in FIG. 2 has a re-ordering buffer, and the transfer data storage unit 205 has a transfer buffer. FIG. 5 illustrates the configuration of the transfer buffer. The transfer buffer stores transfer data as a unit of storage, and has the configuration of N-stage ring buffer to which data is written in units of transfer data.

Next, the header information of transfer data is illustrated in table 3 in FIG. 6, and the data type described as the header information is illustrated in table 4 in FIG. 7.

By adding the data type to the header information, the type of transfer data can be known. The type of data may be normal data, retransmission data, loss information, etc. as listed in table 4 in FIG. 7, and indicates the data as transferred data or retransmitted data. If a packet has been lost in a terminal, and the terminal has issued a retransmission request, then a downstream terminal can be informed of the data lost upstream by transferring the loss information with the sequence number of the lost data to the downstream terminal. Thus, the downstream terminal can be informed that the retransmission data is transferred from upstream without issuing a retransmission request. Each terminal has a loss information list in the retransmission information processing unit 202-2 of the reception control unit 202, and adds loss information to the list when the loss information is received. FIG. 8 illustrates table 5 of the loss information list.

In addition, retransmission data is transferred in advance according to the present embodiment. Each terminal has an advance retransmission data list in the retransmission information processing unit 202-2 of the reception control unit 202, and adds information of retransmission data transferred in advance to the list when the retransmission data is received. FIG. 9 illustrates table 6 of the advance retransmission data list.

The process from detecting the loss of a packet to retransmitting the packet is described below on the basis of the above-mentioned configuration of the functions and data configuration.

Figure 10:
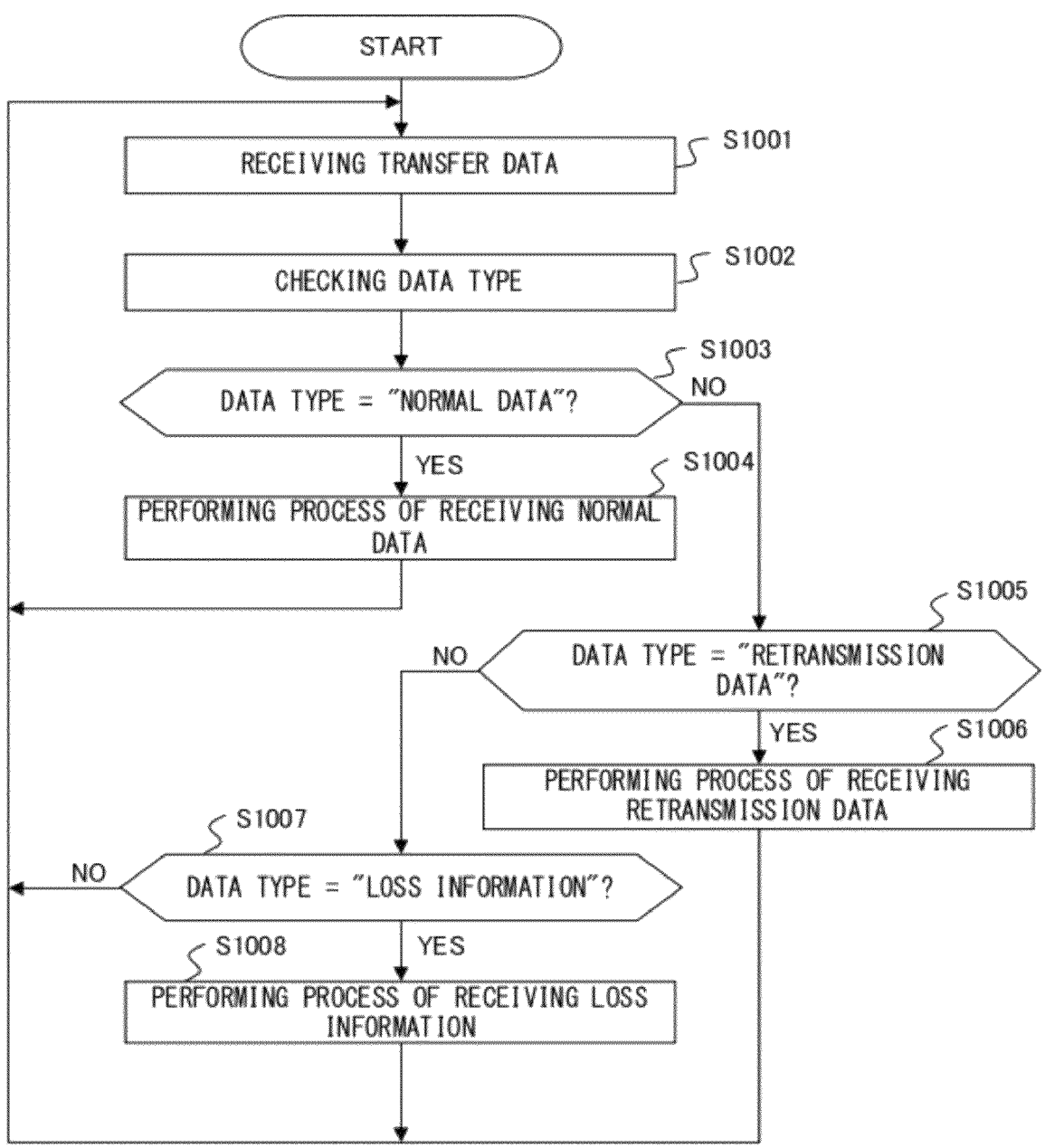
FIG. 10 is a flowchart of the operations of the process performed when transfer data is received.

First, FIG. 10 illustrates the flow of the process performed when transfer data is received. Refer to each component illustrated in FIG. 2 as necessary.

The transfer data may be normal data, retransmission data, or loss information. After the transfer data is received, the data type is checked, and the process to be performed depends on the data type.

The transfer data processing unit 202-1 receives transfer data through the communication unit 206 (step S1001).

The transfer data processing unit 202-1 checks the data type of the transfer data (step S1002).

When the data type is "normal data", the transfer data processing unit 202-1 cooperates with the retransmission information processing unit 202-2 and the control unit 201 to perform a process of receiving normal data (steps S1003→S1004) The details of the operation are described later in the description in FIG. 11. After the process, control is returned to the next process of receiving transfer data (steps S1004→S1001).

When the data type is not "normal data", the transfer data processing unit 202-1 further determines whether or not the data type is "retransmission data" (step S1003→S1005).

When the data type is "retransmission data", the transfer data processing unit 202-1 instructs the retransmission information processing unit 202-2 to perform a process of receiving retransmission data (steps S1005→S1006). The details of the operation are described later with reference to FIG. 16. After the process, control is returned to the next process of receiving transfer data (steps S1006→S1001)

When the data type is not "retransmission data", the transfer data processing unit 202-1 further checks whether or not the data type is "loss information" (steps S1005→S1007).

When the data type is "loss information", the transfer data processing unit 202-1 instructs the retransmission information processing unit 202-2 to perform a process of receiving loss information (steps S1007→S1008). The details of the operation are described later with reference to FIG. 14. After the process, control is returned to the next process of receiving transfer data (steps S1008→S1001).

When the data type is not "loss information", the transfer data processing unit 202-1 returns control to the next process of receiving transfer data (steps S1007→S1001).

Figure 11:
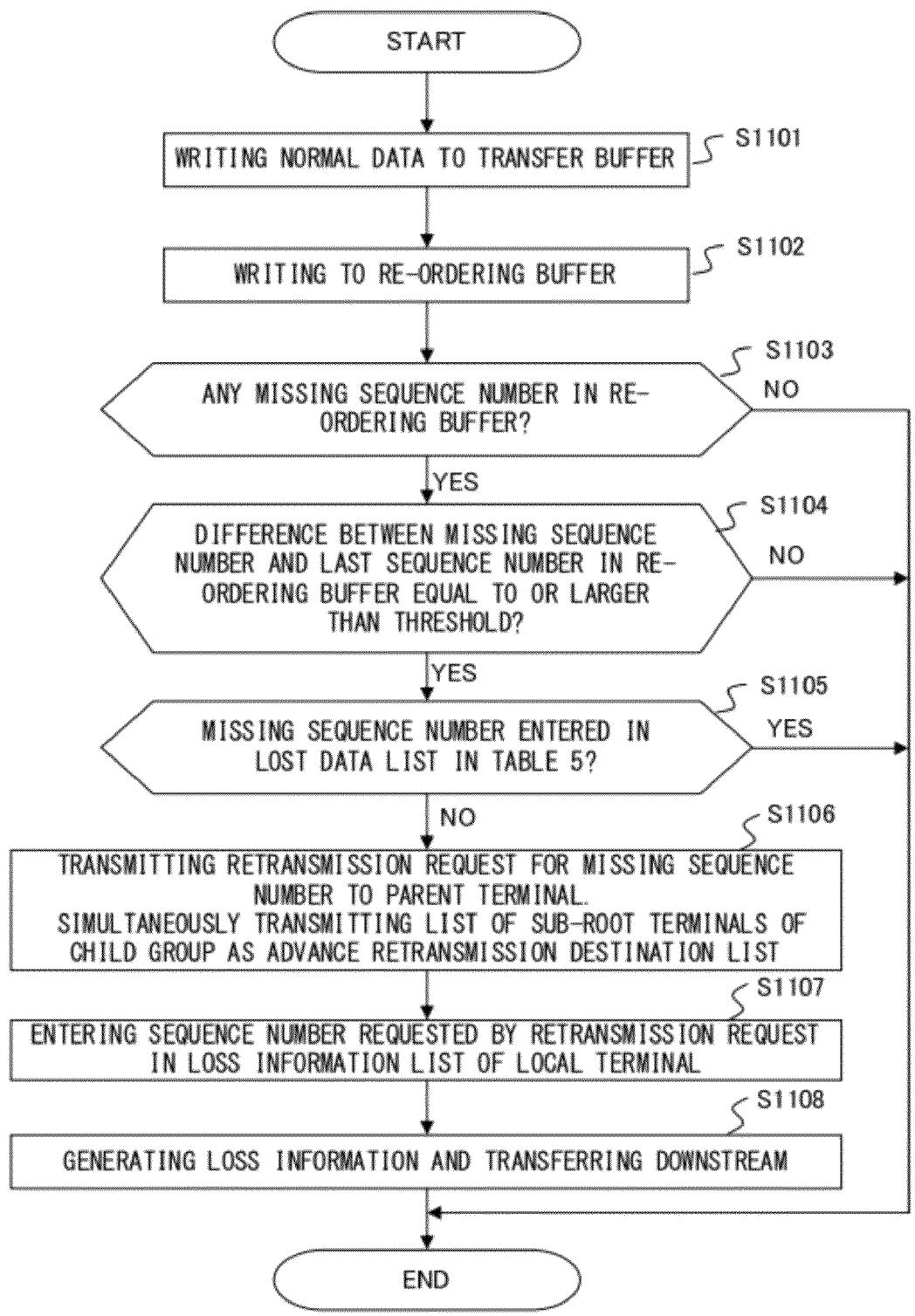
FIG. 11 is a flowchart of the operations of the receiving process of normal data.

FIG. 11 is a flowchart of the operation of the process of receiving normal data performed by the transfer data processing unit 202-1 and the retransmission information processing unit 202-2 in step S1004 illustrated in FIG. 10.

In this process, the transfer data processing unit 202-1 receives normal data and writes the data to the transfer buffer and the re-ordering buffer. Then, the retransmission information processing unit 202-2 determines whether or not there is lost data before the writing operation. if there is lost data, it instructs the control unit 201 to issue a retransmission request. The control unit 201 transmits a retransmission request to its parent terminal as a transmission source. Transmitting a retransmission request to a parent terminal corresponds to the terminal A in FIG. 1.

The flow of the process is described below.

The transfer data processing unit 202-1 writes the received normal data to the transfer buffer (refer to FIG. 5) in the transfer data storage unit 205 (step S1101).

The transfer data processing unit 202-1 writes the normal data to the re-ordering buffer in the re-ordering data storage unit 204 in the order in which the data was sorted with the sequence numbers (step S1102).

The retransmission information processing unit 202-2 checks whether or not there is a missing number in the sequence numbers of the re-ordering buffer in the re-ordering data storage unit 204 (step S1103).

When there is no missing number, the process of receiving normal data in step S1004 illustrated in FIG. 10 is terminated (step S1103→END).

If there is a missing number, the retransmission information processing unit 202-2 checks whether or not the difference between the missing sequence number and the last sequence number of the reordering buffer in the re-ordering data storage unit 204 is equal to or larger than a threshold (step S1104).

If the difference is smaller than the threshold, the process of receiving normal data in step S1004 in FIG. 10 is terminated (step S1104→END).

If the difference is equal to or larger than the threshold, the retransmission information processing unit 202-2 checks whether or not the missing sequence number is stored in the loss information list of table 5 in FIG. 8, of the local terminal (step S1105).

If the missing sequence number is stored in the loss information list, then it is determined that data is lost upstream of the terminal, loss information is propagated to the local terminal, and retransmission data is to be transferred later from upstream. Therefore, no retransmission request is issued and the process of receiving normal data in step S1004 in FIG. 10 is terminated (step S1105→END).

If no missing sequence number is stored in the loss information list, then it is determined that data has been lost during the transmission to the local terminal. Therefore, the retransmission information processing unit 202-2 issues a retransmission request instruction for the missing sequence number to the control unit 201. The control unit 201 transmits to the retransmission information processing unit 203-2 of the transmission control unit 203 an instruction to transmit a retransmission request to the parent terminal as a transmission source by checking the connection information in table 1 in FIG. 3 through the retransmission destination list retrieval unit 201-4 and the connection information unit 201-2. At this time, the control unit 201 generates a list of sub-root terminals of the child group in the group information in table 2 in FIG. 4 through the retransmission destination list retrieval unit 201-4 and the group management information unit 201-3, and transmits the list as an advance retransmission destination list. The retransmission information processing unit 203-2 transmits the retransmission request received from the control unit 201 through the communication unit 206 (step S1106).

Described below is the data structure of a retransmission request. First, the data structure of a message (a connection request to a terminal, a disconnection request from a terminal, a retransmission request, etc.) communicated between the terminals in the distribution path is listed in table 7 in FIG. 12. The data of a message type in table 7 is listed in table 8 in FIG. 13.

As the optional data Nos. 3 through 5 in table 7, the data required by a message is specified. The optional data specified by a retransmission request includes a sequence number requested by the retransmission request and an advance retransmission destination list. The optional data type as data No. 3 in table 7 is "retransmission request information", the data required for the message is stored in the optional data as data No. 5, and the length of the optional data is stored in the optional data length as data No. 4.

Therefore, the data structure of a retransmission request is "retransmission request" in the message type of the message information in table 7, "retransmission request information" is stored in the option type, and the sequence number requested by the retransmission request and the advance retransmission destination list (the number of terminals of simultaneous retransmission destination and the address list of the terminals) are stored in the optional data. The length (byte length) of the actual optional data is stored in the optional data length.

The terminal that has received the retransmission request through the retransmission request message reads the requested sequence number from the optional data as described later, retransmits data of the sequence number to the data source address of the data No. 2 in table 7, and retransmits the data to the terminals of the IP addresses included in the advance retransmission destination list specified by the optional data.

Back to the process of the flowchart of the operation illustrated in FIG. 11, the retransmission information processing unit 202-2 enters the sequence number of the retransmission target requested to the control unit 201 in the loss information list in table 5 in FIG. 8 held in the local terminal (step S1107).

The retransmission information processing unit 202-2 issues to the control unit 201 the sequence number requested by the retransmission request and the transmission instruction for the loss information. The control unit 201 checks the connection information in table 1 in FIG. 3 through the retransmission destination list retrieval unit 201-4 and the connection information unit 201-2, thereby setting the "loss information" as the data type of the header information toward the child terminals located downstream of the local terminal (refer to table 3 in FIG. 6 and table 4 in FIG. 7), and transmitting the transmission instruction of the loss information storing the sequence number requested by the retransmission request to the retransmission information processing unit 203-2 of the transmission control unit 203 (step S1108).

Thus, by transferring loss information downstream, the downstream child terminals are informed that a loss has occurred upstream and retransmission data is to be transferred downstream later.

Figure 14:
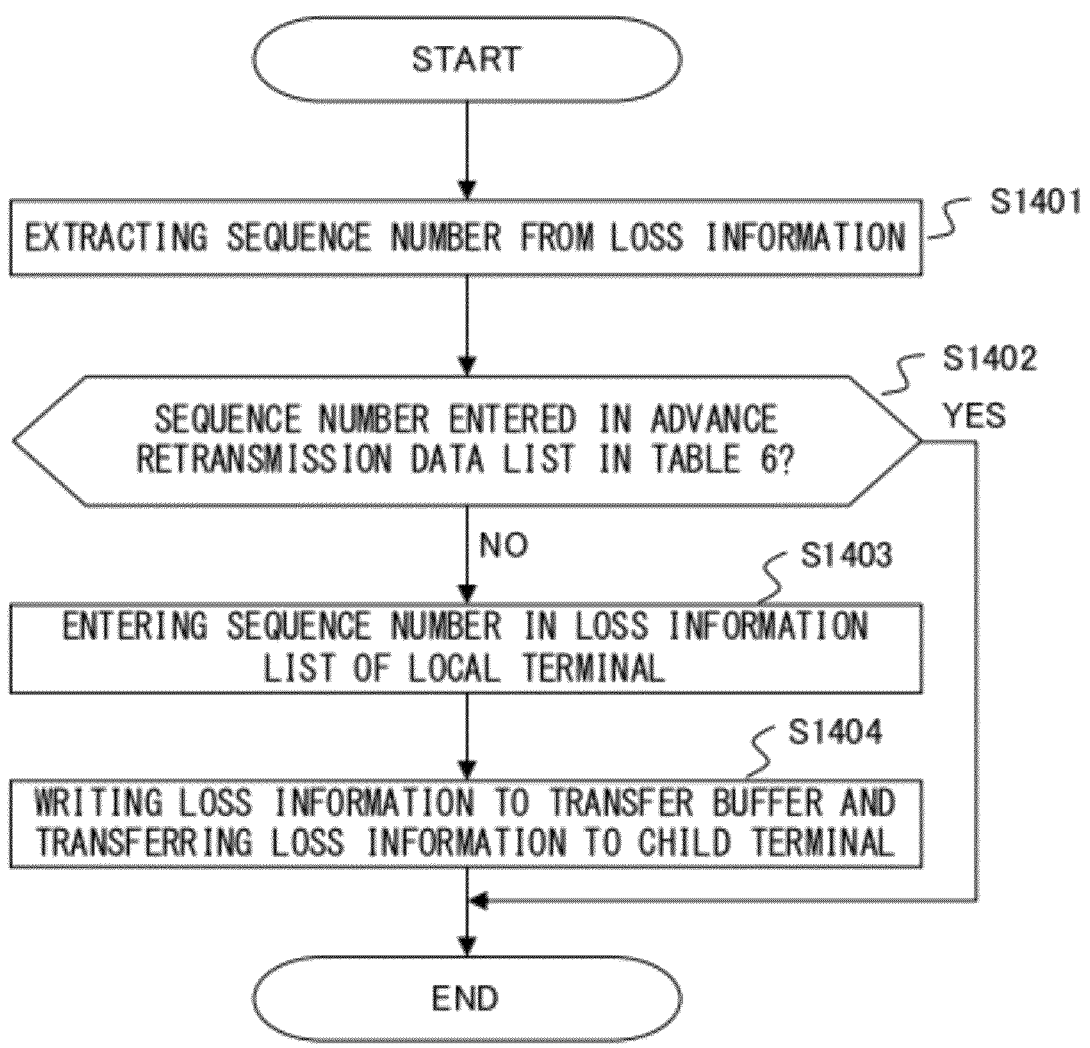
FIG. 14 is a flowchart of the operations of the receiving process of loss information.

FIG. 14 is a flowchart of the operation of the process of receiving loss information performed by the transfer data processing unit 202-1 and the retransmission information processing unit 202-2 in step S1008 illustrated in FIG. 10.

In the example illustrated in FIG. 1, the processes are performed by the downstream terminals in the group 1 to which loss information is transferred from the terminal A and the terminal B.

First, the retransmission information processing unit 202-2 extracts the sequence number from the loss information (step S1401).

Next, the retransmission information processing unit 202-2 checks whether or not the sequence number is stored in the advance retransmission data list in table 6 in FIG. 9 held by the local terminal (step S1402).

If the sequence number is stored in the advance retransmission data list, then the retransmission data transferred in advance has already been received, and loss information is not transferred, thereby terminating the process in step S1008 in FIG. 10. This corresponds to the process by the terminal B.

If the sequence number is not stored in the advance retransmission data list, the retransmission data has not been transferred in advance. Therefore, the retransmission information processing unit 202-2 first enters the sequence number in the loss information list in table 5 in FIG. 8 held by the local terminal (step S1403).

Next, the retransmission information processing unit 202-2 writes the loss information to the transfer buffer in the transfer data storage unit 205, and transfers the information to the child terminals. This corresponds to the process by each terminal in the group 1 in FIG. 1.

Figure 15:
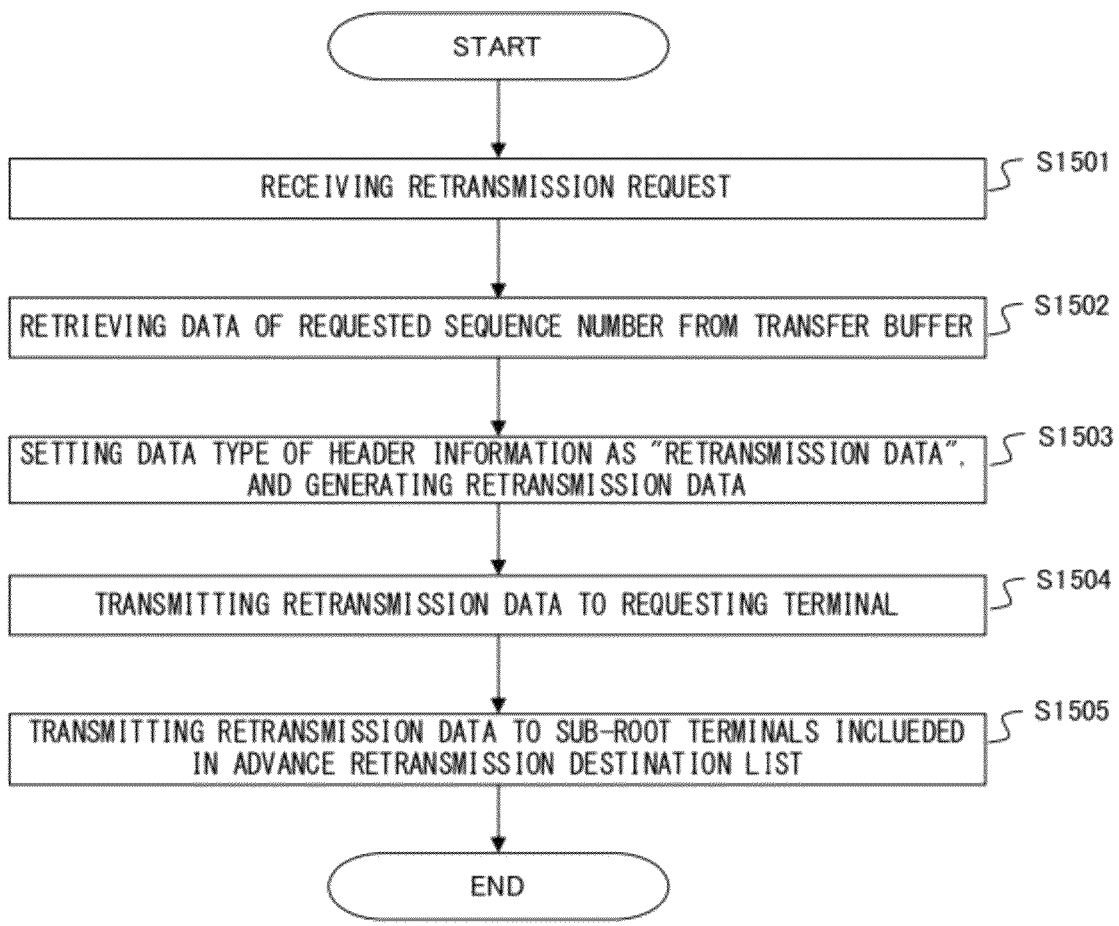
FIG. 15 is a flowchart of the operations of the process performed by a terminal which has received a retransmission request.

Next, the flow of the process of the terminal that has received the retransmission request is described in the flow-chart of the operation illustrated in FIG. 15. This corresponds to the process by the terminal C in FIG. 1.

First, the transfer data processing unit 202-1 of the reception control unit 202 receives the retransmission request transmitted by a downstream terminal on the basis of the process in step S1106 in FIG. 11 (step S1501).

Thus, control is passed to the retransmission information processing unit 203-2 of the transmission control unit 203. The retransmission information processing unit 203-2 extracts the sequence number from the retransmission request, and retrieves the data including the sequence number from the transfer buffer (refer to FIG. 5) in the transfer data storage unit 205.

The retransmission information processing unit 203-2 generates the retransmission data (refer to table 3 in FIG. 6 and table 4 in FIG. 7) in which "retransmission data" is set as the data type of the header information (step S1503).

The retransmission information processing unit 203-2 transmits to a terminal that has transmitted the retransmission request the retransmission data with the IP address of the terminal as the destination (step S1504). This corresponds to the process of transmitting retransmission data from the terminal C to the terminal A illustrated in FIG. 1.

The retransmission information processing unit 203-2 transmits to each sub-root terminal included in the advance retransmission destination list stored in the retransmission request the retransmission data with the IP address of each sub-root terminal as the destination through the communication unit 206 (step S1505). This corresponds to the process in which the retransmission data is transferred in advance from the terminal C to the terminal B.

Figure 16:
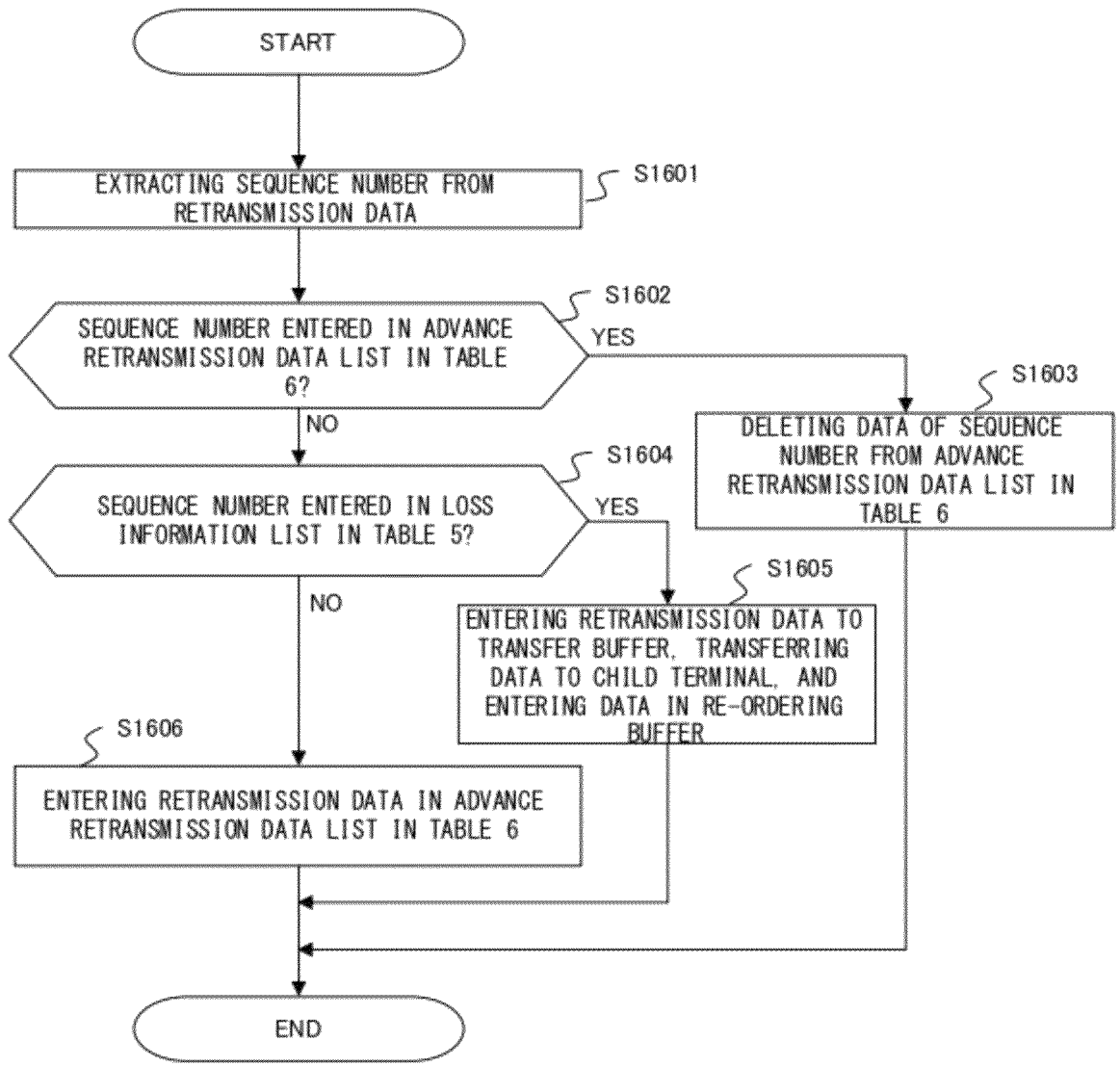
FIG. 16 is a flowchart of the operations of the receiving process of retransmission data.

FIG. 16 is a flowchart of the operation of the process of receiving retransmission data performed by the transfer data processing unit 202-1 and the retransmission information processing unit 202-2 in step S1006 illustrated in FIG. 10.

When a terminal receives retransmission data, the following three cases are considered.

Case 1: When the local terminal issues a retransmission request, or when the local terminal is in a group of the terminal that has issued the retransmission request, and loss information and retransmission data are transferred to the local terminal.

Case 2: When the local terminal receives retransmission data by an advance transfer.

Case 3: When the local terminal first receives retransmission data by an advance transfer, and then receives the retransmission data transferred from an upstream terminal.

The case 1 and the case 2 can be determined by checking whether or not loss information has been received.

The case 1 corresponds to the case in which the loss information has been received. The operation after receiving the retransmission data is transferring the received retransmission data to downstream (step S1605).

The case 2 corresponds to the case in which the loss information has not been received. The operation after receiving the retransmission data is entering the received retransmission data in the advance retransmission data list in table 6 in FIG. 9 (step S1606). Afterwards, it is supplemented as normal data (refer to the description in FIG. 17 described later).

The case 3 is determined depending on whether or not the data of the same sequence number is entered in the advance retransmission data list. The case 3 corresponds to the case in which the data is entered in the list, and the cases 1 and 2 correspond to the cases in which the data is not entered in the list. After receiving the retransmission data, the received retransmission data is not transferred since the retransmission data has already been transferred in advance, and the data of the sequence number is deleted from the advance retransmission data list (step S1603).

The flow of the process is described below.

The retransmission information processing unit 202-2 extracts the sequence number from the retransmission data (step S1601).

The retransmission information processing unit 202-2 determines whether or not the sequence number is entered in the advance retransmission data list in table 6 in FIG. 9 held by the local terminal (step S1602).

If the sequence number is entered in the advance retransmission data list (corresponding to the case 3), then the advance retransmission data has been received, the retransmission data is not transferred any more, and the retransmission information processing unit 202-2 deletes the data of the sequence number from the advance retransmission data list in table 6 in FIG. 9 held by the local terminal (steps S1602→S1603).

If the sequence number is not entered in the advance retransmission data list, then the retransmission information processing unit 202-2 further determines whether or not the sequence number has been entered in the loss information list in table 6 in FIG. 8 held by the local terminal (step S1604).

If the sequence number is entered in the loss information list (corresponding to the case 1), then the retransmission information processing unit 202-2 writes the retransmission data to the transfer buffer of the transfer data storage unit 205, transfers the data to a child terminal, and also writes the data to the re-ordering buffer of the re-ordering data storage unit 204. The retransmission information processing unit 202-2 deletes the information of the sequence number from the loss information list in table 5 in FIG. 8 held by the local terminal (step S1605).

If the sequence number is not entered in the loss information list (corresponding to the case 2), then the retransmission information processing unit 202-2 enters the retransmission data in the advance retransmission data list in table 6 in FIG. 9 held by the local terminal (step S1606).

After the processes in step S1603, S1605, or S1606, the process of receiving retransmission data in step S1006 is terminated.

Finally, the process of supplementing with advance retransmission data is described below with reference to the flowchart of the operation in FIG. 17.

If the retransmission data transferred in advance in step S1606 in FIG. 16 is received, the retransmission data is added to the advance retransmission data list in table 6 in FIG. 9 held by the local terminal.

The following process is performed on the forward retransmission data list in table 6. The process is performed by the retransmission information processing unit 202-2 each time after the process of receiving normal data is performed in step S1004 in FIG. 10.

First, the retransmission information processing unit 202-2 extracts the sequence number of the received normal data (step S1701).

Next, the retransmission information processing unit 202-2 checks whether or not a sequence number smaller than the above-mentioned sequence number is entered in the advance retransmission data list in table 6 in FIG. 9 held by the local terminal, and whether or not the supplementing process has not been performed (step S1702). If the sequence number has reached the maximum value and then become the minimum value, then a determination is made with the cyclic sequence numbers taken into account.

Figure 17:
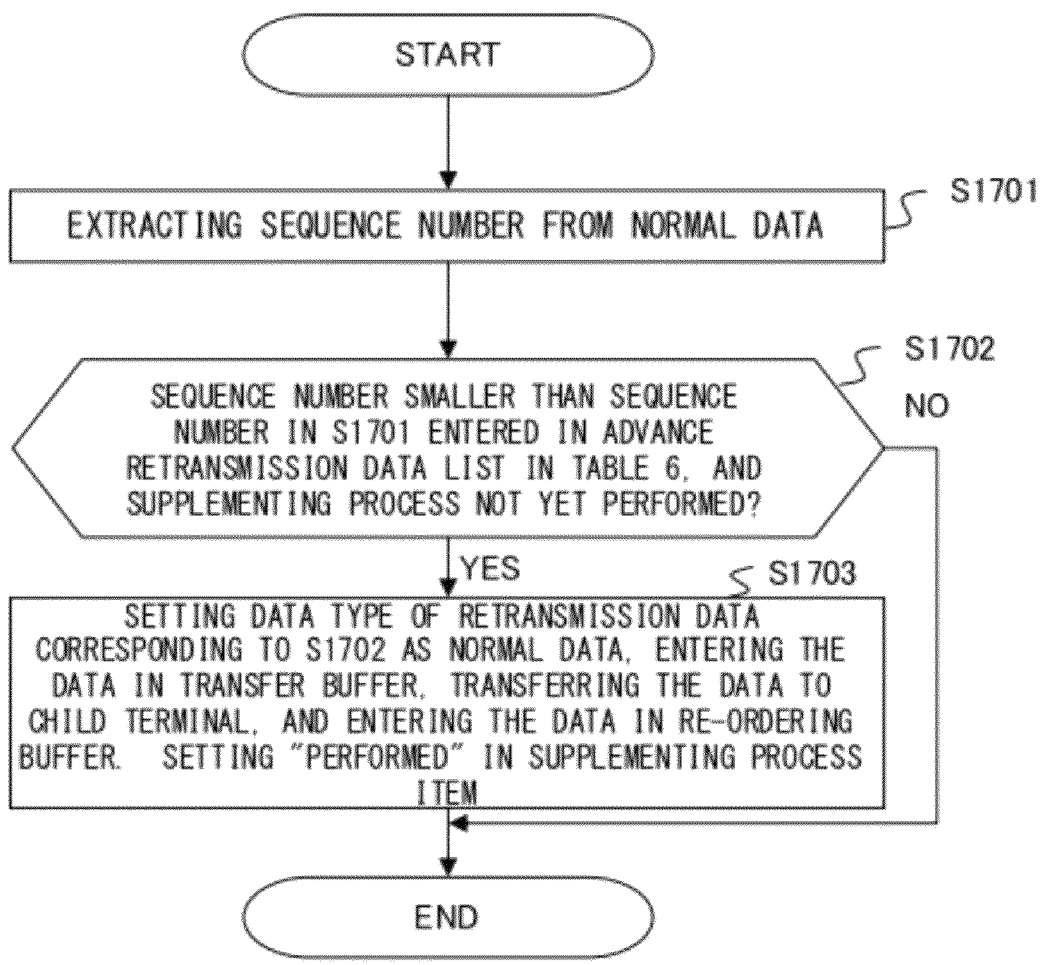
FIG. 17 is a flowchart of the operations of the supplementing process of retransmission data transferred in advance.
Figure 18:
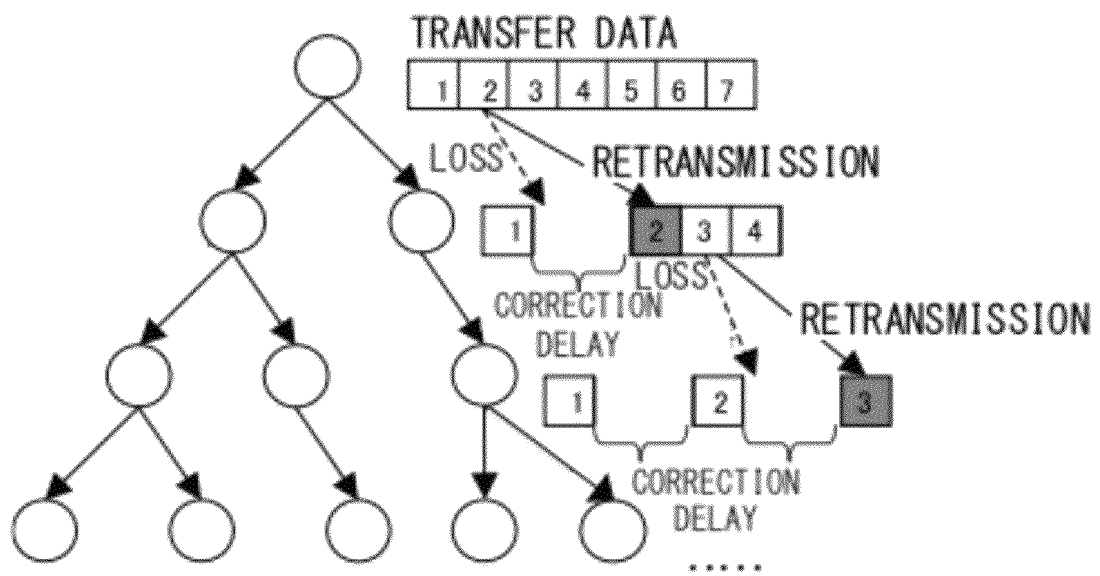
FIG. 18 is an explanatory view (1) of the problem with the related art.
Figure 19:
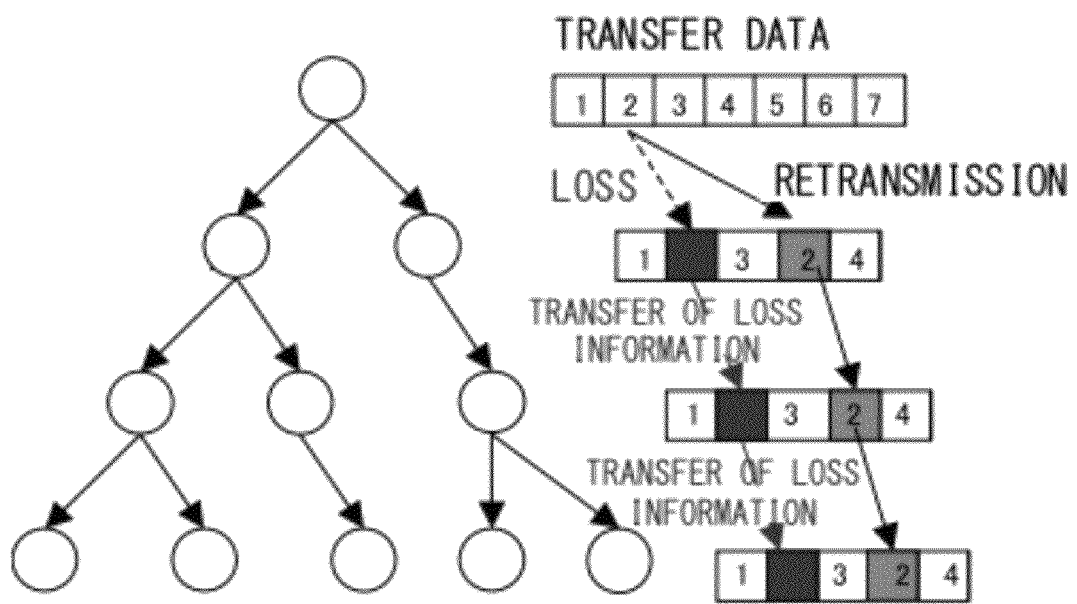
FIG. 19 is an explanatory view (2) of the problem with the related art.

If a sequence number smaller than the above-mentioned sequence number is not entered in the advance retransmission data list or if the supplementing process has been performed, then the retransmission information processing unit 202-2 terminates the supplementing process of the flowchart of the operation in FIG. 17 (step S1702→END).

If a sequence number smaller than the above-mentioned sequence number is entered in the advance retransmission data list and the supplementing process has not been performed, then the retransmission information processing unit 202-2 reads a packet of advance retransmission data from each entry hit in the retrieval in the advance retransmission data list, changes the data type of each packet (refer to table 3 in FIG. 6 and table 4 in FIG. 7) into normal data, puts the resultant packet into the transfer buffer of the transfer data storage unit 205, transfers the packet to a child terminal, and also writes the packet to the re-ordering buffer of the re-ordering data storage unit 204. The write positions to these to buffers are controlled so that they can precede the write positions of the normal data being processed. Simultaneously, the retransmission information processing unit 202-2 sets the information indicating "PERFORMED" in the supplementing process item of each entry of the advance retransmission data list in table 6 in FIG. 9 held by the local terminal (step S1703).

As described above, by supplementing the portion propagated as lost data with the advance retransmission data, it is not necessary for a terminal located downstream of the local terminal to perform a retransmitting process by transferring loss information and retransmission data.

In the embodiments described above, the loss information and retransmission data are controlled in the flowcharts of the operations in FIGS. 14 and 16 so that they cannot be propagated any more and discarded at the leading terminal in the group to which data is transferred in advance. However, control may also be performed to discard them at the last terminal in a group immediately before that group.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for performing retransmission control when a packet is lost in a multicast distribution system in which terminal devices on a distribution path are hierarchically grouped, comprising:

transmitting from a first terminal device which has detected a loss of a receiving packet to a second terminal device located upstream of the first terminal device a retransmission request for a packet retransmission to the first terminal device and a third terminal device which receives a packet first in a group located downstream of a group to which the first terminal device belongs; and transmitting a retransmission packet from the second terminal device which has received the retransmission request to both the first and third terminal devices.

2. The method according to claim 1, further comprising:
sequentially transferring packet loss information from the first terminal device to respective terminal devices located downstream of the first terminal device; and
sequentially transferring the retransmission packet received from the second terminal device from the first terminal device to the respective terminal devices located downstream of the first terminal device.

3. The method according to claim 2, further comprising discarding in the third terminal device packet loss information transferred from a group located upstream of a group to which the third terminal device belongs, and the retransmission packet transferred corresponding to the packet loss information.

4. The method according to claim 2, further comprising discarding packet loss information and a retransmission packet to be transferred to downstream terminals at a last terminal in the group to which the first terminal device belongs.

5. The method according to claim 1, further comprising supplementing a first normal packet received from a group located upstream of a group to which the third terminal device belongs with the retransmission packet received from the second terminal device as a second normal packet in the third terminal device, and transmitting the first normal packet and the second normal packet from the third terminal device to a terminal device located downstream of the third terminal device.

6. An apparatus which performs retransmission control when a packet is lost in a multicast distribution system in which terminal devices on a distribution path are hierarchically grouped into an apparatus group having a first terminal device comprising the apparatus and a downstream group comprising a third terminal device, comprising:

a retransmission request transmission unit configured to transmit a retransmission request for a packet retransmission to the apparatus and a terminal device that first receives a packet in the downstream group located downstream of the apparatus group to which the apparatus belongs, to a terminal device located upstream of the apparatus when a loss of a receiving packet is detected; and a retransmission packet transmission unit configured to transmit a retransmission packet to each terminal device specified as a retransmission destination by the retransmission request when the retransmission request is received, wherein the third terminal device receives a packet first in the downstream group located downstream of the apparatus group to which the first terminal device belongs and a retransmission packet is transmitted from a second terminal device which is located upstream of the apparatus and has received the retransmission request to both the first and third terminal devices.

* * * * *